United States Patent [19]

Blocker

[11] Patent Number: 5,112,942

[45] Date of Patent: May 12, 1992

[54] POLYIMIDE COMPOSITIONS

[75] Inventor: Wesley C. Blocker, Baton Rouge, La.

[73] Assignee: Ethyl Corporation, Richmond, Va.

[21] Appl. No.: 588,280

[22] Filed: Sep. 26, 1990

[51] Int. Cl.$^5$ .................. C08G 69/26; C08G 69/28; C08G 8/02; C08G 14/00
[52] U.S. Cl. ............................ 528/353; 528/125; 528/126; 528/128; 528/170; 528/171; 528/172; 528/173; 528/175; 528/176; 528/179; 528/185; 528/188; 528/189; 528/220; 528/229; 528/350; 528/351; 528/352
[58] Field of Search ............... 528/125, 126, 128, 172, 528/170, 173, 171, 179, 175, 185, 188, 189, 229, 350, 351, 352, 353, 220, 229, 176

[56] References Cited

U.S. PATENT DOCUMENTS

| | | | |
|---|---|---|---|
| 3,766,138 | 10/1973 | Crivello | 528/387 |
| 4,675,366 | 6/1987 | Evans et al. | 525/435 |
| 4,837,300 | 6/1989 | St. Clair et al. | 528/353 |
| 4,851,505 | 7/1989 | Hayes | 528/353 |

Primary Examiner—John Kight, III
Assistant Examiner—P. Hampton-Hightower
Attorney, Agent, or Firm—Richard J. Hammond

[57] ABSTRACT

Copolyimides and their precursors are disclosed comprising units represented by the formula

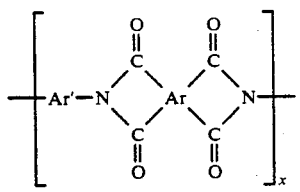

and -continued

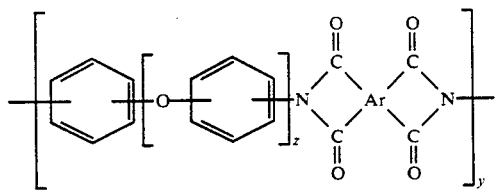

wherein Ar' is

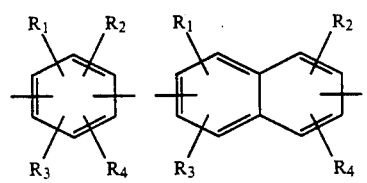

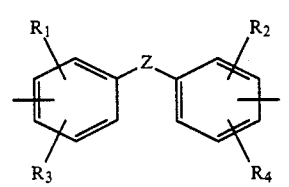

where $R_1$, $R_2$, $R_3$ and $R_4$ are the same or different and are hydrogen or $C_1$ to $C_6$ linear or branched alkyl, with the proviso that $R_1$, $R_2$, $R_3$ and $R_4$ cannot simultaneously be hydrogen and where Z is a chemical bond,

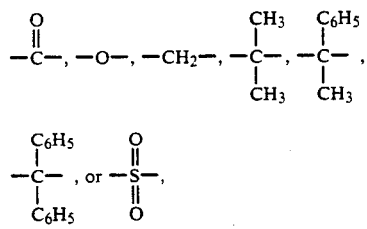

Ar is the tetravalent residue of a tetracarboxylic acid or acid dianhydride or di- or tetraester thereof, where x and y are integers from about 100 to about 1,000, and the ratio of x to y is from about 1:99 to about 49:51, and z is 0-5.

These copolymers have improved resistance to stress cracking. They may also be used in applications such as coatings, or adhesives.

19 Claims, No Drawings

POLYMIDE COMPOSITIONS

This invention relates to certain aromatic imide copolymers having aliphatic substituents on the aromatic backbone. This invention particularly relates to aliphatic-substituted aromatic copolyimides having improved resistance to stress cracking.

BACKGROUND

Polyimides have excellent acceptance in demanding applications such as aerospace, traction motors and flexible printed circuitry because of their unique combination of physical, electrical and chemical properties. Polyimide articles, such as films, are usually manufactured in a two-stage process. The first stage is a polycondensation reaction between a dianhydride and diamine in a suitable solvent. The resulting polyamic acid solution is then fabricated into a shaped article, e.g., a film, usually by solvent casting. In the second stage, the polyamic acid film is either converted chemically or thermally to the polyimide by elimination of water.

Polyimides derived from a 2,2-bis[4-(aminophenoxy)phenyl]hexafluoropropane are useful, inter alia, for the production of insulating varnishes and electronic coatings on semiconductor wafers, such as polysilicon wafers as disclosed in application Ser. No. 515,223 filed Apr. 27, 1990. As noted in that application, one way of forming such coating on the wafers is to apply a solution of a polyamic acid polymer derived from such 2,2-bis[4-(aminophenoxy)phenyl]hexafluoropropane to the wafer and thereafter bake the coated wafer to cure (imidize) the resin so that the corresponding polyimide is formed.

During this curing, two main processes take place: removal of solvent and a chemical conversion of the polyamic acid to polyimide. Both these processes result in loss of film volume and can produce stresses in the film if the losses occur after the film has become (semi-)rigid. In addition, stresses in the film can arise when these is a mismatch between the coefficient of expansion of film and substrate as the film cools from its curing temperature to room temperature. Upon exposure to certain organic solvents, these stresses visibly appear in the coatings as breaks in the film. Such breaks are typically referred to as cracks or crazes. According to the aforesaid Application, this problem is addressed by adding another diamine, a diamine having aliphatic substituents.

U.S. Pat. No. 4,851,505 discloses polyimidies which contain such diamines having aliphatic substituents and in which the carboxylic moiety is tetracarboxyl biphenyl. The polyimides yield optically transparent films which can be cast from solution.

SUMMARY OF THE INVENTION

It has now been found that a combination of aromatic diamine having aliphatic substituents with a second non-fluorinated diamine, especially one having one or more phenoxy groups, provides polyimides which are resistant to stress cracking.

Specifically the polyimides of the present invention are characterized by recurring units of the formula

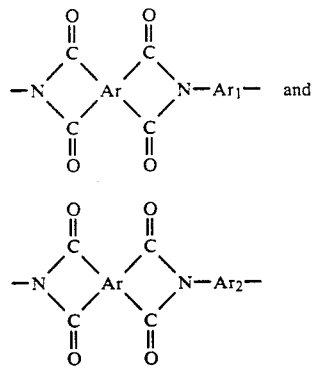

where Ar is a tetravalent radical containing one or more benzenoid rings in which the four carbonyl groups are attached directly to different carbon atoms in such tetravelent radical and in which each pair of carbonyl groups is attached to adjacent carbon atoms in a benzenoid ring. $Ar_1$ is an aromatic moiety containing 6 to 40 carbon atoms and having at least one 6-carbon ring, each ring being characterized by benzenoid unsaturation, and having at least two $C_1$ to $C_6$ linear or branched alkyl groups on at least one of each ring. $Ar_2$ is an aromatic moiety of the formula

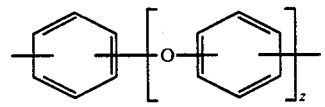

in which z is 0-5, preferably 1 or 2.

The invention also provides a method for producing the polyimides of the present invention.

DETAILED DESCRIPTION

The polyimides of the present invention are usually made from the dianhydride of a suitable tetracarboxylic acid, as shown below.

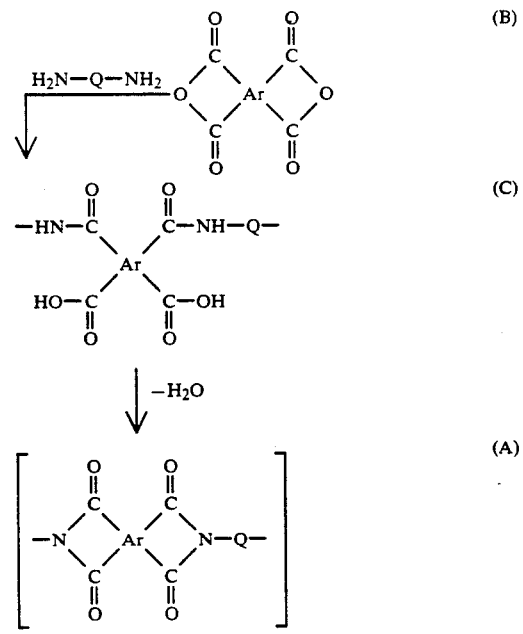

Thus, dianhydride (B) may be first converted by reaction with diamine H₂NQNH₂ into polyamide acid (C), which then can be chemically or thermally dehydrated to polyimide (A). In cases where copolymers are desired, as for this invention, the diamine compound includes a second diamine NH₂Q¹—NH₂, which provides a unit similar to that shown as (C) except that a further polyamic acid is also formed, i.e.,

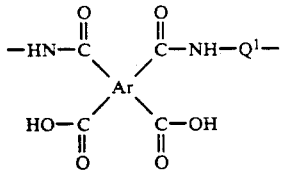

As noted above, the dianhydrides or their derivatives are reacted with a t least two different aromatic diamines. One such diamine is an aliphatic-substituted aromatic diamine of the formula

where Ar' is a divalent aromatic nucleus. Preferred Ar' groups are

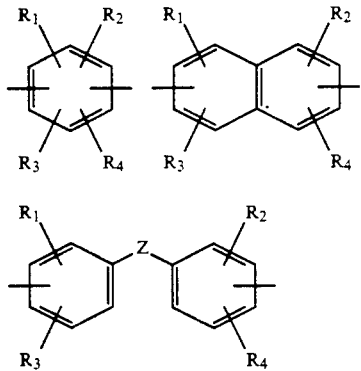

where Z is a chemical bond,

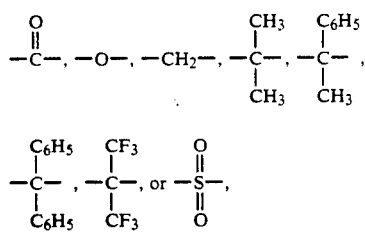

and where $R_1$, $R_2$, $R_3$ and $R_4$ are the same or different and are hydrogen or $C_1$ to $C_6$ linear or branched alkyl (i.e., lower alkyl), with the proviso that $R_1$, $R_2$, $R_3$ and $R_4$ cannot simultaneously be hydrogen.

Preferably Z is a chemical bond,

—O— or —CH₂—, and Ar' is

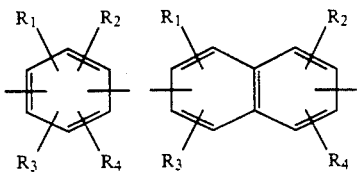

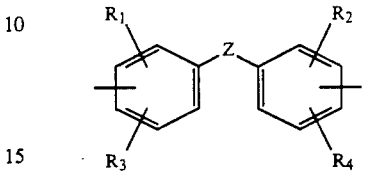

where $R_1$, $R_2$, $R_3$ and $R_4$ are the same or different and are hydrogen, methyl, ethyl, i-propyl or n-propyl, with the proviso that $R_1$, $R_2$, $R_3$ and $R_4$ cannot simultaneously be hydrogen. Of these preferred groups, most preferred is where Z is a chemical bond, —O—, or —CH₂— and $R_1$, $R_2$, $R_3$ and $R_4$ are methyl or ethyl; where the group Ar' is comprised of two or more aromatic rings, it is also most preferred that $R_1$, $R_2$, $R_3$ $R_4$ are located on the carbon atoms adjacent to the nitrogen substituent, i.e., ortho and ortho'.

Specific examples of the aliphatic-substituted aromatic diamines useful in the present invention are
3,3'5,5'-tetramethyl-4,4'-diaminobenzophenone;
3,3'5,5'-tetraethyl-4,4'-diaminobenzophenone;
3,3'5,5'tetra-n-propyl-4,4'-diaminobenzophenone;
3,3'-dimethyl-4,4'-oxydianiline;
3,3'5,5'-tetramethyl-4,4'-oxydianile;
3,3'5,5'-tetraethyl-4,4'-diaminodiphenyl methane;
3,3',5,5'-tetramethyl-4,4'-diaminodiphenyl methane;
bis-[4-(3,5-dimethyl-4-aminophenoxy)phenyl]methane;
bis-[4-(3,5-diethyl-4-aminophenoxy)phenyl]methane;
bis-[4-(3,5-dipropyl-4-aminophenoxy)phenyl]methane;
1-phenyl-bis-[4-(3,5-dimethyl-4-aminophenoxy)-phenyl]ethane
3,3'-dimethylbenzidine;
3,3',5,5'-tetramethyl benzidine;
2,2'-dimethyl-4,4'-diaminobiphenyl;
3,3',5,5'-tetramethyl-4,4'-diaminoterphenyl;
3,3',5,5'-tetramethyl-4,4'-diaminoquarterphenyl;
3,5-diethyl-2,4-diaminotoluene (DETDA)
1,4-diamino-2,3-diethylbenzene;
2,4-diamino-3,5-diethyltoluene; and the like.

The second aromatic diamines useful in preparing the copolymers of the present invention are those of the formula

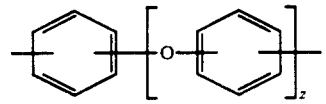

where z is 0-5.

Specific examples of these second diamines are
ortho-, meta-, or para-phenylenediamine (DPA), oxydianiline (ODA), 1,3-bis[4-aminophenoxy]benzene (APB), and the like.

It should be noted that, while the above-disclosed aliphatic-substituted aromatic diamines and second diamines are used to prepare the compositions of the present invention, further final property modification is possible by using one or more other aromatic diamine such as those of the formula:

NH$_2$—R—NH$_2$ where R is a divalent aromatic nucleus that may be the same or different from Ar' or the phenoxy diamine. In such cases terpolymers are formed.

As specific examples of other aromatic diamines conforming to the above definition there may be mentioned: diaminotoluenes, such as 2,4-diaminotoluene; 1,4-diamino-2-methoxybenzene; 2,5-diaminoxylene; 1,3-diamino-4-chlorobenzene; 1,4-diamino-2,5-dichlorobenzene; 1,4-diamino-2-bromobenzene; 1,3-diamino-4-isopropylbenzene; 4,4'-diaminodiphenyl-2,2propane; 4,4'-diamino-diphenylmethane; 2,2'- or 4,4'-diaminostilbene; 4,4'-diamino-2,2',3,3',5,5',6,6'-octafluorodiphenylmethane; 4,4'-diaminodiphenylether; 4,4'-diamino-2,2',3,3',5,5',6,6'-octafluorodiphenylether; 4,4'-diaminodiphenyl-thioether; 4,4'-diaminobenzoic acid phenyl ester; 2,2'- or 4,4'-diaminobenzophenone; 4,4'-diaminobenzil; 4-(4'-aminophenylcarbamoyl)aniline, bis-(4-aminophenyl)phosphine oxide; bis-(4-aminophenyl)methylphosphine oxide; bis-(3-aminophenyl)methylphosphine oxide; bis-(4-aminophenyl)phenylphosphine oxide; bis-(4-aminophenyl)cyclohexylphosphine oxide; 1,8- or 1,5-diaminonaphthalene; 1,5-diaminoanthraquinone; diaminofluoroanthene; 3,0-diaminochrysene; diaminopyrene; bis-(4-aminophenyl)-diethylsilane; bis-(4-aminophenyl)dimethylsilane; bis-(4-aminophenyl)tetramethyldisiloxane; and the like.

The polyimides of the present invention will contain at least one randomly distributed unit of formula:

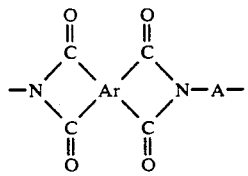

wherein —A— is the unit —Ar'— and at least one unit of the formula

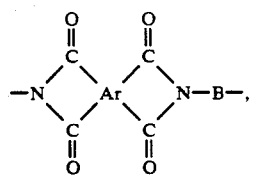

where —B— is the unit

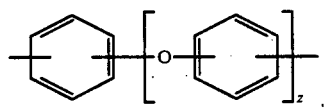

wherein Ar is a tetravalent aromatic radical and Ar' and z are as previously defined.

Polyimide precursors, i.e. polyamic acids are also embodied in this invention. These materials contain at least one unit of the formula:

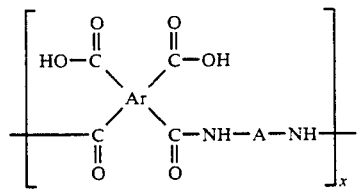

and at least one unit of the formula

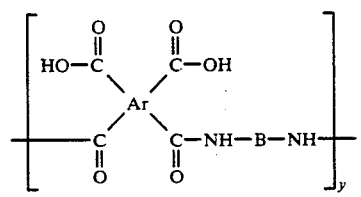

where x and y are integers of from 100 up to about 1,000 and Ar, A and B are defined above.

These polyimides are prepared by the reaction of a dianhydride or its carboxylic acid or ester derivative with a diamine. The dianhydride used in this invention can be represented by the formula:

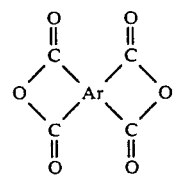

In these dianhydrides Ar is a tetravalent radical selected from substituted and unsubstituted heterocyclic or aromatic groups or combinations thereof. Each pair of the carbonyl groups attached to such radical are ortho to each other.

Ar can be a tetravalent benzene or naphthalene nucleus illustrated by:

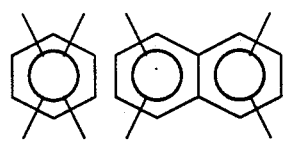

Ar can also be a tetravalent group of formula

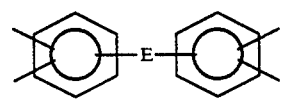

where E is

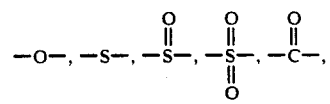

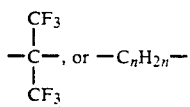

where n is an integer from 1 to 8. These compounds are illustrated by the following:

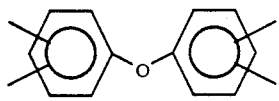

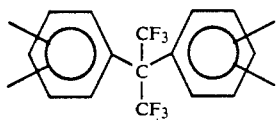

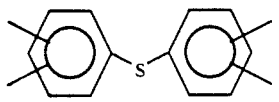

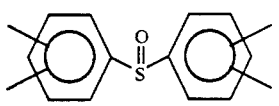

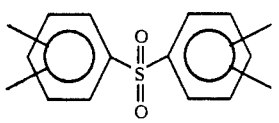

Ar can also be the tetravalent residue of formula

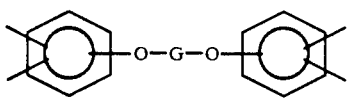

where G is phenylene or a group of formula

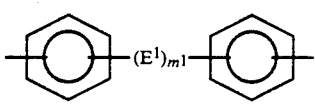

where $m^1$ is 0 or 1 and $E^1$ is the same or different than E defined above.

In this embodiment, Ar is illustrated by

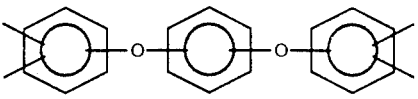

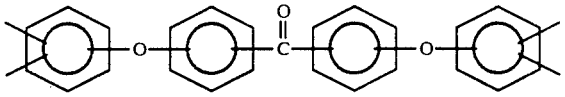

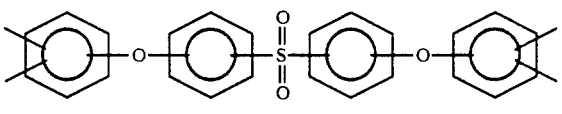

Similarly, the ether linkage can be replaced by

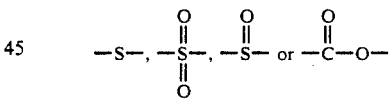

to provide useful dianhydrides or carboxylic acid or ester derivatives thereof.

The dianhydride component can be used alone or in combination with one or more other dianhydrides.

The following may be mentioned as examples of suitable tetracarboxylic acid dianhydrides useful in the present invention: pyromellitic acid dianhydride; 3,3',4,4'-benzophenonetetracarboxylic acid dianhydride; 2,3,3',4'-benzophenonetetracarboxylic acid dianhydride; 2,2',3,3'-benzophenonetetracarboxylic acid dianhydride; 4,4',5,5',6,6'-hexafluorobenzophenone-2,2',3,3'-tetracarboxylic acid dianhydride; bis-(2,3-dicarboxyphenyl)-methane dianhydride; bis(3,4-dicarboxyphenyl)methane dianhydride; bis-(2,5,6-trifluoro3,4-dicarboxyphenyl)methane dianhydride; 1,1-bis-(3,4-dicarboxyphenyl)ethane dianhydride; 2,2bis-(3,4-dicarboxyphenyl)propane dianhydride; 2,2bis-(2,3-dicarboxyphenyl)propane dianhydride; 2,2-bis(3,4-dicarboxyphenyl)hexafluoropropane dianhydride; bis-(3,4-dicarboxyphenyl)ether dianhydride; bis-(2,3-dicarboxyphenyl)ether dianhydride; bis-(2,5,6-trifluoro-3,4-dicarboxyphenyl)ether dianhydride; bis-(3,4-dicarboxyphenyl)sulphone dianhydride; bis-(2,5,6-trifluoro-3,4-dicarboxyphenyl)sulphone dianhydride; bis-(3,4-dicarboxyphenyl)phenylphosphonate dianhydride; bis-(3,4-dicarboxyphenyl)phenylphosphine oxide dianhydride; bis-(3,4-dicarboxyphenyl)diethylsilane dianhydride; bis-(3,4-dicarboxyphenyl)tetramethyldisiloxane dianhydride; 3,3',4,4'-tetracarboxybenzoyloxybenzene dianhydride; 1,4,5,8-naphthalenetetracarboxylic acid dianhydride; 2,3,6,7-naphthalene-tetracarboxylic acid dianhydride; 1,2,5,6-naphthalene-tetracarboxylic acid dianhydride; 2,6-dichloronaphthalene-1,4,5,8-tetracarboxylic acid dianhydride; 2,7-dichloronaphthalene-1,4,5,8-tetracarboxylic acid dianhydride; 2,3,6,7-tetrachloronaphthalene-1,4,5,8-tetracarboxylic acid dianhydride; 1,4,5,8-tetrafluoronaphthalene-2,3,6,7-tetracarboxylic acid dianhydride; phenanthrene-1,8,9,10-tetracarboxylic acid dianhydride; 3,4,9,10-perylenetetracarboxylic acid dianhydride; thiophene-2,3,4,5-tetracarboxylic acid dianhydride; pyrazine-2,3,5,6-tetracarboxylic acid dianhydride; pyridine-2,3,5,6-tetracarboxylic acid dianhydride; tetrahydrofurane-2,3,4,5-tetracarboxylic acid dianhydride; 3,3',4,4-azobezene-tetracarboxylic acid dianhydride; 3,3',4,4'-azoxybenzenetetracarboxylic acid dianhydride; and 1,2,3,4-cyclopentanetetracarboxylic acid dianhydride.

The reaction used to prepare the polyimides is usually carried out in a solvent. Suitable solvents have polar groups, such as alcohol, ether, ketone, amide, or sulfoxide. Preferred solvents are N,N-dimethylacetamide, N,N-diethylacetamide, N,N-dimethylformamide, N,N-dimethylmethoxyacetamide, N-methyl-2pyrrolidone, N-acetyl-2pyrrolidone, N-methyl-ε-caprolactam, hexamethylphosphoric acid triamide (hexametapol), N,N,N',N'-tetramethylurea, tetrahydrothiophene dioxide (sulpholane), tetrahydrofuran and dimethylsulphoxide.

The reaction can also be carried out in mixtures of such solvents. On the other hand it is also possible to dilute these preferred solvent systems with other organic aprotic solvents, such as aromatic, cycloaliphatic or aliphatic, optionally chlorinated hydrocarbons, for example benzene, toluene, xylene, cyclohexane, pentane, hexane, petroleum ether, methylene chloride, tetrahydrofuran, cyclohexanone and dioxane.

After completion of the reaction the solvents can be removed in the usual manner if desired, for example by distillation, if appropriate, under reduced pressure. Copolymers manufactured according to the invention can also be precipitated according to known methods by pouring the reaction solution into a non-solvent, such as water or aliphatic hydrocarbons, petroleum ether, but especially methanol, diethyl ether, diethers of monoethylene glycol, diethylene glycol or triethylene glycol, or acetonitrile and the like, and dried if desired.

In the first step of the reaction, a polyamic acid solution is typically produced. See reaction paths, compound (C). In the preferred method for forming the compositions of this invention, this solution is further heated, causing cyclization and polyimide formation. The cyclization of the polyamide acid polymers obtained according to the invention to give the corresponding phenoxy-containing, aliphatic-substituted copolyimide is carried out in a manner which is conventional preferably by heating to temperatures between about 100° and 400° C., or by treatment with a dehydrating agent by itself or mixed with a tertiary amine; examples to be mentioned are a mixture of acetic anhydride and triethylamine or pyridine.

In applications where these improved compositions are to be used as coating materials, the polyamic acid solutions prepared as noted earlier can be used as formed from the reaction.

The diamines are often prereacted with a few mole % (up to about 10 mole%) of an end-capping agent (e.g., phthalic anhydride) to restrict the growth of polymer chains and reduce the melt viscosity of the polyimide products, thus making them easier to process into void-free composite parts.

It will be appreciated of course that the polyamic component will generally be of relatively low molecular weight, e.g., its weight average molecular weight will often fall in the range of about 5,000 to 250,000. Higher molecular weights tend to be more difficult to process because of the increase in viscosity of the resulting solutions.

In the compositions of the present invention it is critical to have the amount of aliphatic-substituted aromatic diamine monomer in the diamine reactants less than about 50% since physical properties are adversely affected by too high a content of such monomer. Consequently the amine

should be used with the amine

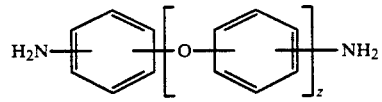

at 49 mole percent or less for the preparation of these polyimides. Concentrations of such amine preferably should be about 12 to 49 mole percent. Preferred is a ratio of the two amines at about 15:85 to 40:60; most preferably about 20:80 to about 30:70 aliphatic-substituted aromatic diamine to the second aromatic diamine.

In one embodiment of this aspect the polyimides are employed as wire coatings and as coatings for filaments of metal, glass and ceramic. In still another embodiment, the polyimides are used as primers or adhesion promoters between a substrate, such as glass, metal and ceramic, and a matrix such as epoxy, polyester, phenol and rubber.

A preferred embodiment of the present invention is the use of these polyimides as adhesives. Typically such adhesives are applied as a solution of the polyamic acid admixed with the dianhydride (or diester derivative thereof) and diamine mixture. After being applied to the surface, the mixture is dried (by heating) to remove the solvent. Imidization is then accomplished as described in more detail in the Examples.

The following disclosure is provided to illustrate specific embodiments and aspects of the invention but does not imply any limitation of the scope of the invention.

EXAMPLE 1

Into a 250 ml glass round-bottomed flask equipped with a mechanical agitator and nitrogen bubbler was placed a solution containing 13.981 g of ODA dissolved in most of the total solvent used. The solvent system consisted of 112.0 g of N-methyl pyrrolidone (NMP) and 112.0 g of cyclohexanone. To this solution was added 31.019 g of 2,2-bis(3,4-dicarboxyphenyl)-1,1,1,3,3,3-hexafluoropropane dianhydride (6-FDA). The 6-FDA container was rinsed with the remaining solvent and added to the reactor. The resulting polymer solution was stirred overnight under a nitrogen blanket at ambient temperature.

EXAMPLE 2

The procedure in Example 1 was repeated, except (4,4'-diamino-3,3',5,5'-tetraethyldiphenyl)methane (MBDEA) was also added to the reactor with ODA. The chemicals used in this example were: 6-FDA 29.993 g; ODA 10.81 g; MBDEA 4.192 g; NMP 52.5 g and cyclohexanone 52.5 g.

EXAMPLE 3

The procedure in Example 1 was repeated, except ODA was replaced with 1,3-bis[4-aminophenoxy]benzene (APB). The chemicals used in this example were: 6-FDA 27.141 g; APB 17.859 g; NMP 90.0 g and cyclohexanone 90.0 g.

EXAMPLE 4

The procedure in Example 3 was repeated, except MBDEA was also added to the reactor with APB. The chemicals used in this example were: 6-FDA 27.008 g; APB 14.220 g; MBDEA 3.778 g; NMP 52.5 g and cyclohexanone 52.5 g.

Microcracking Test Procedure

A 10-micron layer of polyimide was spin-coated on a silicon wafer. The coating was dried at 100° C. for 1 minute on a hotplate equipped with a vacuum source and cured in a 400° C. oven for 30 minutes. The cured and coated wafer was dipped into N-methylpyrrolidinone for 1 hr, removed and rinsed with water. After drying with a heat gun, the coating was examined for stress cracking using an Alpha Step 200 surface profile instrument. The results appear in Table 1.

TABLE 1

| Example | Dianhydride | Diamine Phenoxy Amine | (Mole %) | Diamine Aliphatic-substituted Aromatic Amine | (Mole %) | Stress Cracking |
|---|---|---|---|---|---|---|
| 1 | 6-FDA | ODA | (100) | | | Yes |
| 2 | 6-FDA | ODA | (80) | MBDEA | (20) | No |
| 3 | 6-FDA | APB | (100) | | | Yes |
| 4 | 6-FDA | APB | (80) | MBDEA | (20) | No |

APB - 1,3-bis[4-aminophenoxy]benzene
ODA - oxydianiline
6-FDA - 2,2-bis(3,4-dicarboxyphenyl)-1,1,1,3,3,3,-hexafluoropropane dianhydride
MBDEA - (4,4'-diamino-3,3',5,5'-tetraethyldiphenyl)methane

I claim:
1. A polyimide resin composition comprising randomly distributed units of the formula

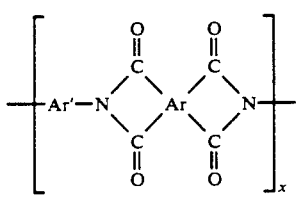

and

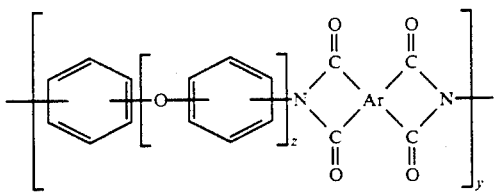

wherein Ar is

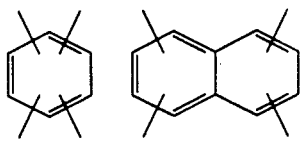

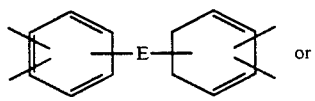

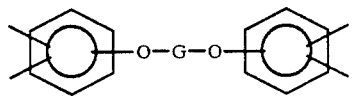

where E is

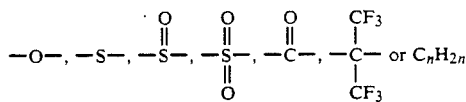

where n is an integer from about 1–8, and G is phenylene or

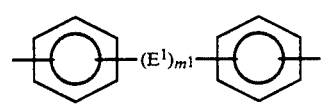

where $M^1$ is 0 or 1 and $E^1$ is the same as E as previously defined; and
wherein Ar' is

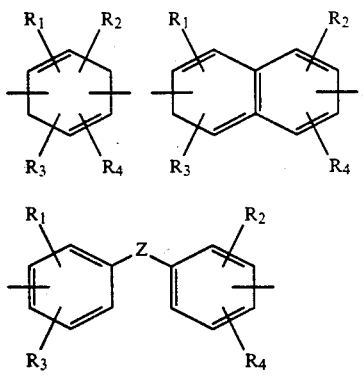

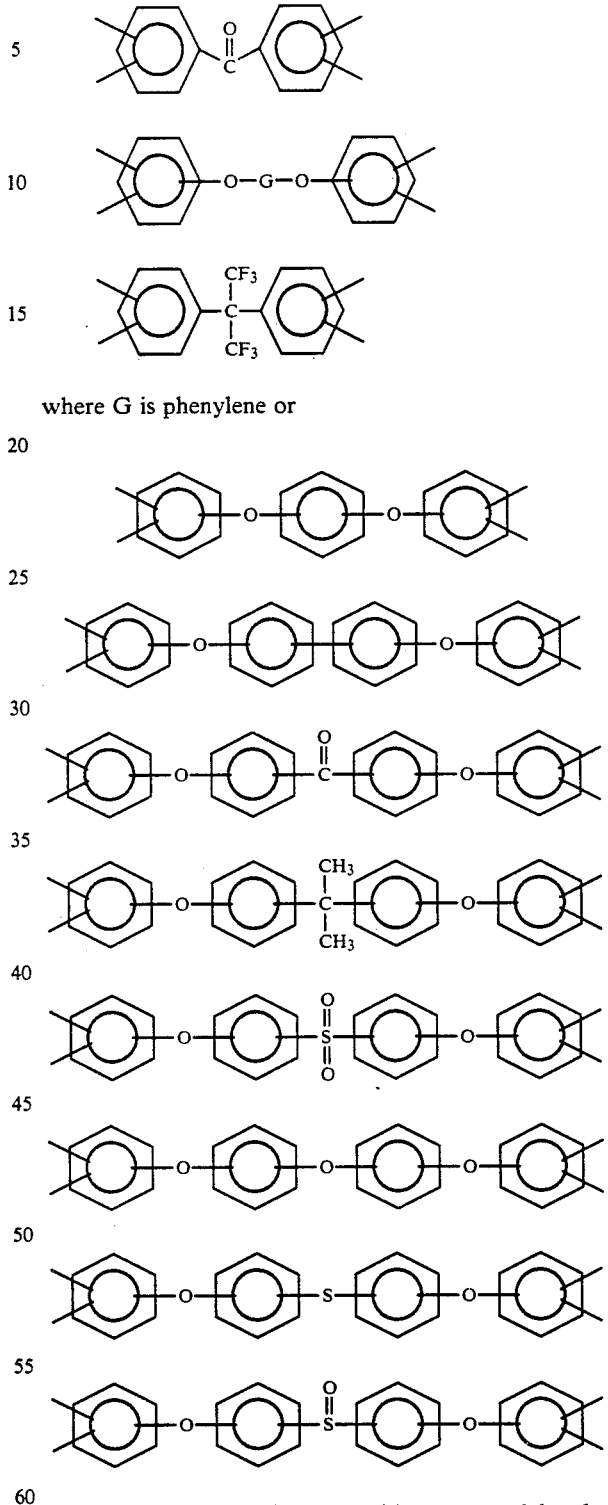

where R₁, R₂, R₃ and R₄ are the same or different and are hydrogen or $C_1$ to $C_6$ linear or branched alkyl with the proviso that R₁, R₂, R₃ and R₄ cannot simultaneously be hydrogen and where Z is a chemical bond,

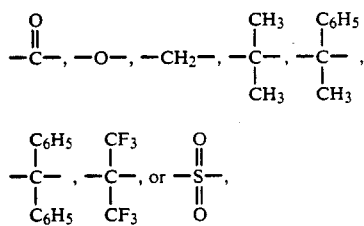

and the mole ratio of x:y is from about 1:99 to about 49:51, and z is 0–5.

2. The composition of claim 1 wherein Z is a chemical bond,

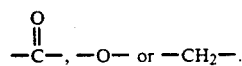

3. The composition of claim 1 wherein Ar is

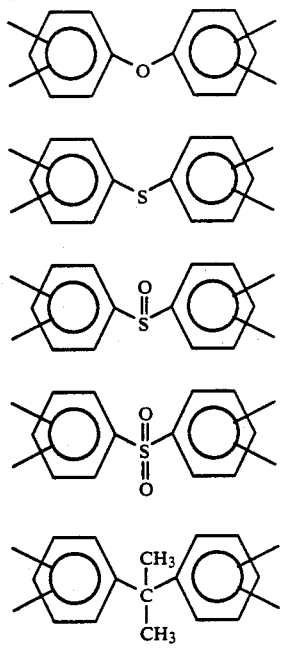

where G is phenylene or

4. A polyimide resin composition prepared by the process comprising treating substantially equimolar amount so fan aliphatic-substituted aromatic diamine of the formula

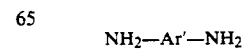

where Ar' is

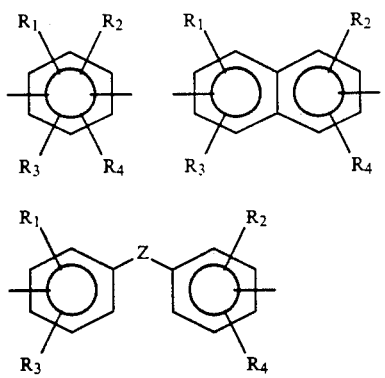

where R₁, R₂, R₃ and R₄ are the same or different and are hydrogen or $C_1$ to $C_6$ linear or branched alkyl, with the proviso that R₁, R₂, R₃ and R₄ cannot simultaneously be hydrogen, and where Z is a chemical bond,

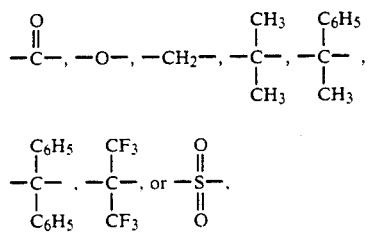

and a second diamine of the formula

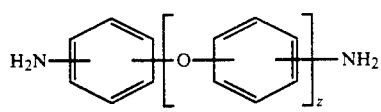

where z is 0-5, with an aromatic carboxylic acid dianhydride or di ester or tetraester derivative thereof of the formula

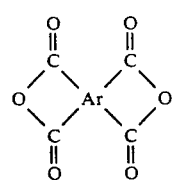

where Ar is

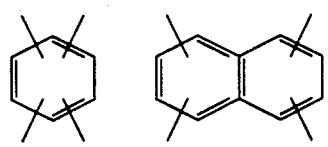

or

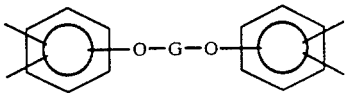

where E is

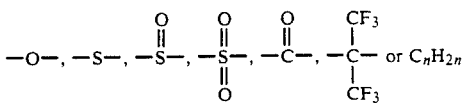

where n is an integer from about 1-8, and G is phenylene or

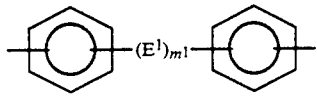

where $m^1$ is 0 or 1 and $E^1$ is the same as E as previously defined; and forming said polyimide composition having at least one unit of the formula

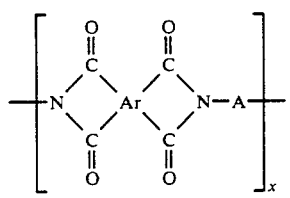

and at least one unit of the formula

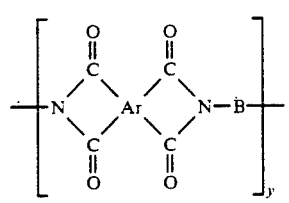

where —A— is —Ar'— and B is

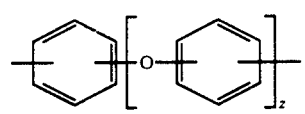

wherein Ar, Ar' and Z are as previously defined, and where the ratio of x:y is from about 1:99 to about 49:51.

5. The composition of claim 4 wherein Z is a chemical bond,

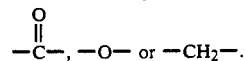

6. The composition of claim 5 wherein Ar is

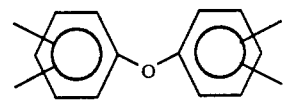

-continued

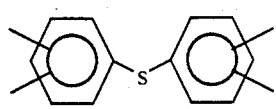
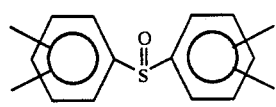
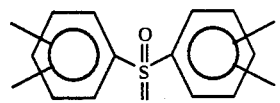
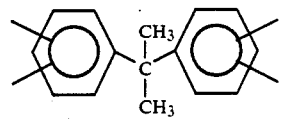
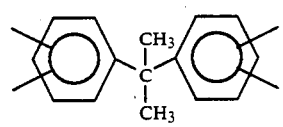
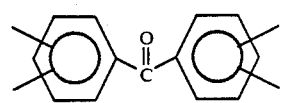
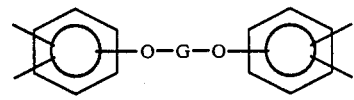

where G is phenylene or

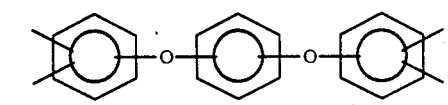
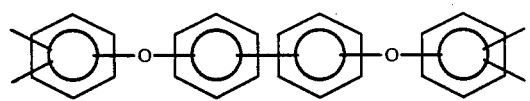
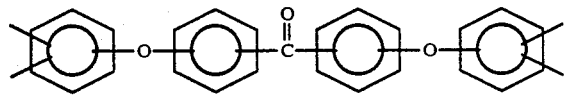
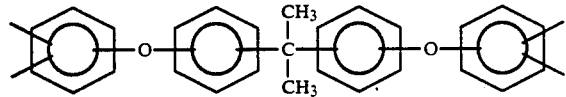
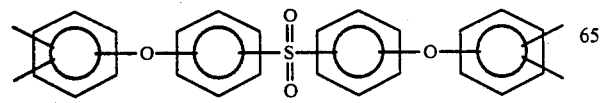

-continued

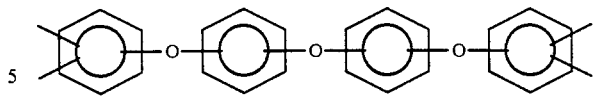
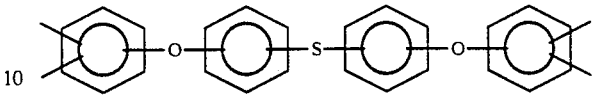
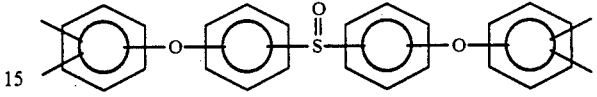

7. The composition of claim 6 wherein said aliphatic-substituted aromatic diamine is 3,3',5,5'-tetramethyl-4,4'-diaminodiphenylmethane; 3,3',5,5'-tetraethyl-4,4'-diaminodiphenylmethane; or 3,3',5,5'-tetramethyl-4,4'-diaminobiphenyl.

8. The composition of claim 7 wherein said second diamine is oxydianiline or 1,3-bis[4-aminophenoxy]benzene.

9. The composition of claim 8 wherein the ratio of said aliphatic-substituted aromatic diamine to said second diamine is about 10:90 to about 30:70.

10. An adhesive composition comprising a polyamic acid comprising randomly distributed units of the formula

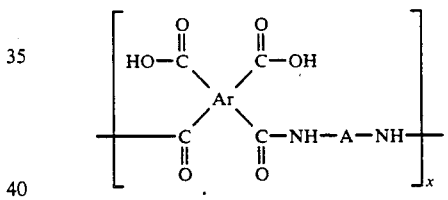

and

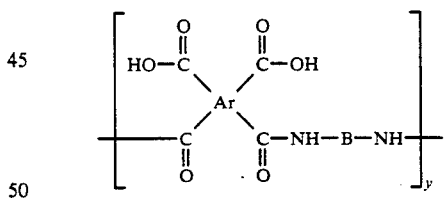

where x and y are integers of from about 100 to about 1,000, Ar

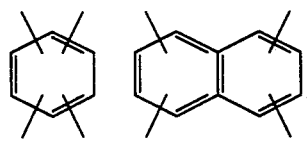

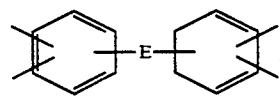

or

-continued

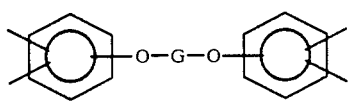

where E is

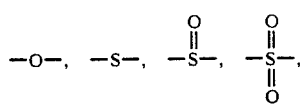

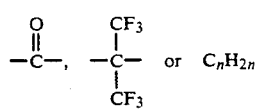

where n is an integer from about 1-8, and G is phenylene or

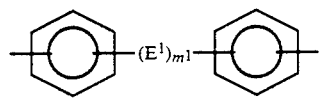

where $m^1$ is 0 or 1 and $E^1$ is the same as E as previously defined; and A is —Ar'— where —Ar'— is

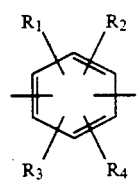 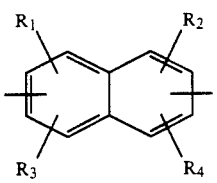

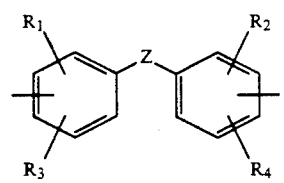

where $R_1$, $R_2$, $R_3$ and $R_4$ are the same or different and are hydrogen or $C_1$ to $C_6$ linear or branched alkyl, with the proviso that $R_1$, $R_2$, $R_3$ and $R_4$ cannot simultaneously be hydrogen, and where Z is a chemical bond,

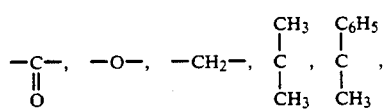

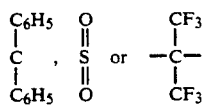

B is 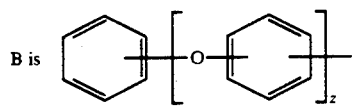

and the mole ratio of x:y is from about 1:99 to about 49:51.

11. The composition of claim 10 wherein Z is a chemical bond, $$-\overset{O}{\underset{\|}{C}}-, \quad -O- \quad \text{or} \quad -CH_2-.$$

12. The composition of claim 11 wherein Ar is

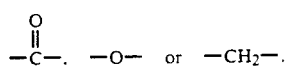

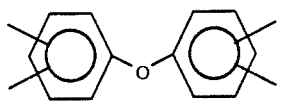

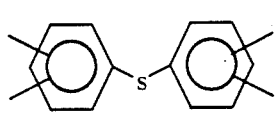

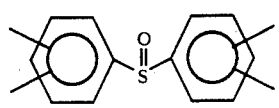

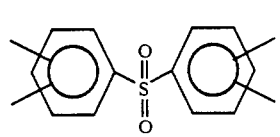

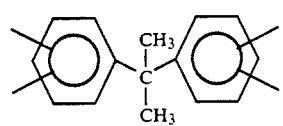

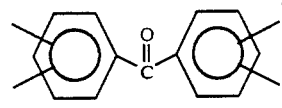

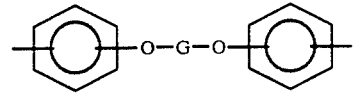

where G is phenylene or

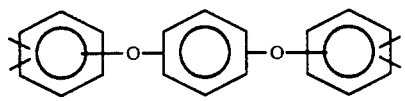

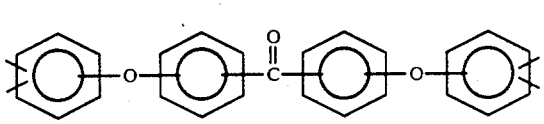

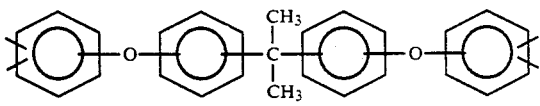

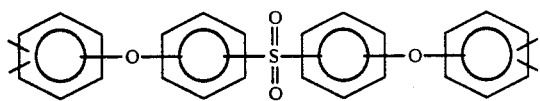

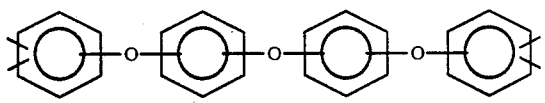

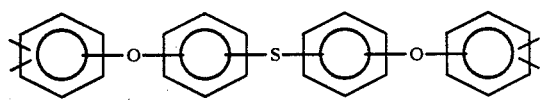

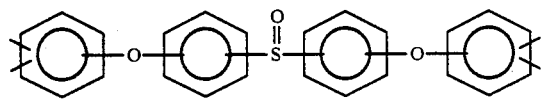

13. A polyimide resin composition prepared by the process comprising treating substantially equimolar amounts of an aliphatic-substituted aromatic diamine of the formula

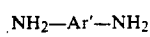

where Ar' is

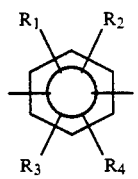 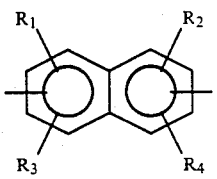

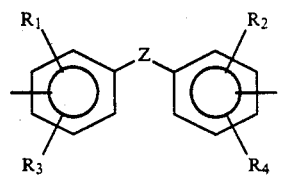

where $R_1$, $R_2$, $R_3$ and $R_4$ are the same or different and are hydrogen or $C_1$ to $C_6$ linear or branched alkyl, with the proviso that $R_1$, $R_2$, $R_3$, and $R_4$ cannot simultaneously be hydrogen, and where Z is a chemical bond,

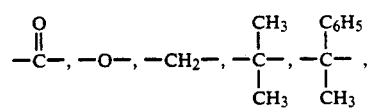

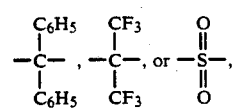

and a second diamine of the formula

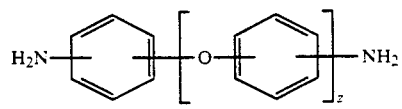

where z is 0–5, with an aromatic carboxylic acid dianhydride or diester or tetraester derivative thereof of the formula

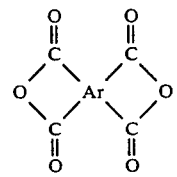

where Ar is

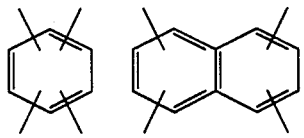

or

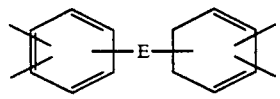

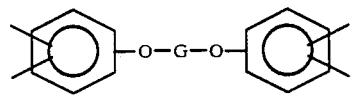

where E is

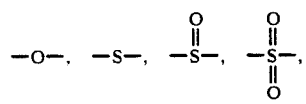

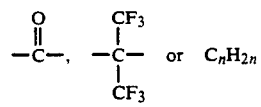

where n is an integer from about 1–8, and G is phenylene or

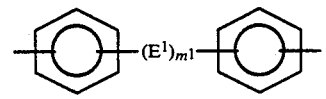

where $m^1$ is 0 or 1 and $E^1$ is the same as E as previously defined; and forming said polyimide composition having at least one unit of the formula:

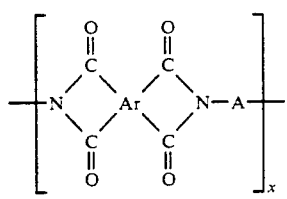

and at least one unit of the formula:

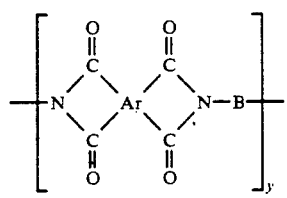

where —A— is —Ar'— and B is

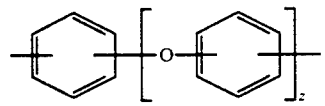

wherein Ar and Ar' are as previously defined, z is 0-5, and where the ratio of x:y is from about 1:99 to about 49:51.

14. The composition of claim 13 wherein Z is a chemical bond,

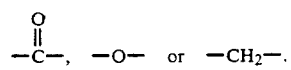

15. The composition of claim 14 wherein Ar is

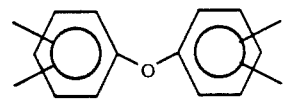

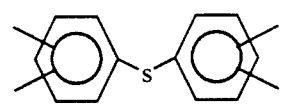

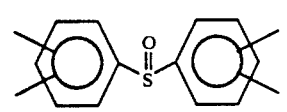

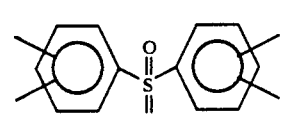

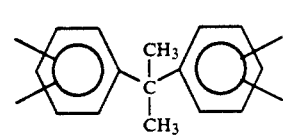

-continued

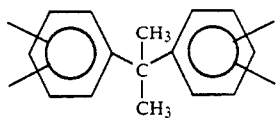

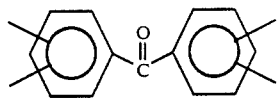

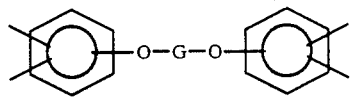

where G is phenylene or

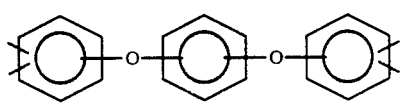

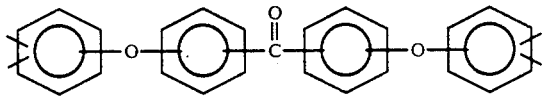

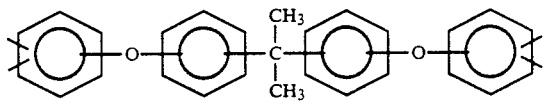

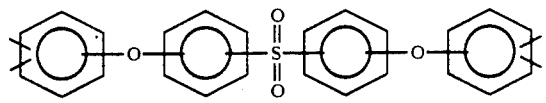

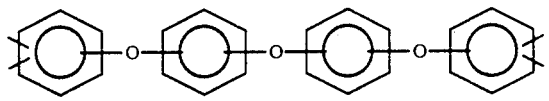

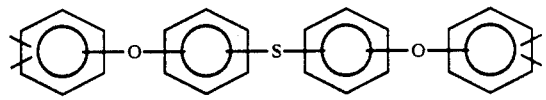

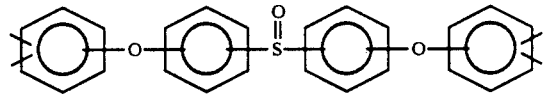

16. The composition of claim 15 wherein said aliphatic-substituted aromatic diamine is 3,3',5,5'-tetraethyl-4,4'-diaminodiphenyl-methane; or 3,3',5,5'-tetramethyl-4,4'-diaminobiphenyl.

17. The composition of claim 16 wherein said second diamine is oxydianiline or 1,3-bis[4-aminophenoxy]benzene.

18. The composition of claim 17 wherein the ratio of said aliphatic-substituted aromatic diamine to said second diamine is about 10:90 to about 30:70.

19. A process of preparing a polyimide having randomly distributed units of the formula

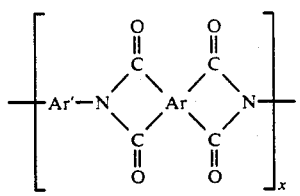

and

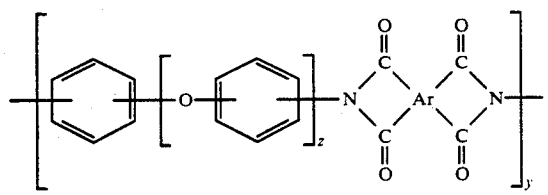

wherein Ar is

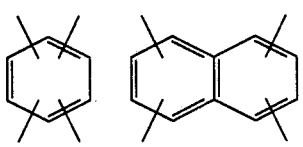

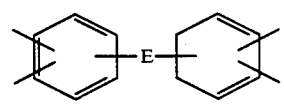

or

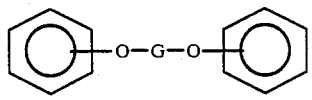

where E is

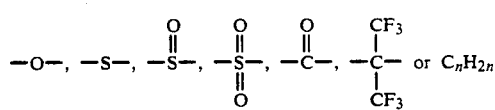

where n is an integer from about 1-8, and G is phenylene or

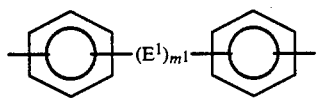

where $m^1$ is 0 or 1 and $E^1$ is the same as E as previously defined; and
wherein Ar' is

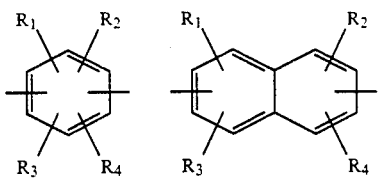

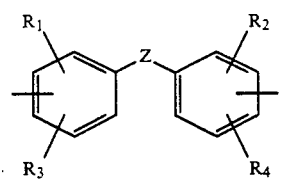

where $R_1$, $R_2$, $R_3$ and $R_4$ are the same or different and are hydrogen or $C_1$ to $C_6$ linear or branched alkyl, with the proviso that $R_1$, $R_2$, $R_3$ and $R_4$ can not simultaneously be hydrogen and where Z is a chemical bond,

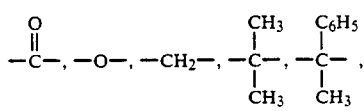

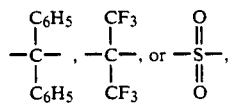

and the mole ratio of x:y is from about 1:99 to about 49:51, and z is 0-5, said process comprising dehydrating a polyamic acid having randomly distributed units of the formula

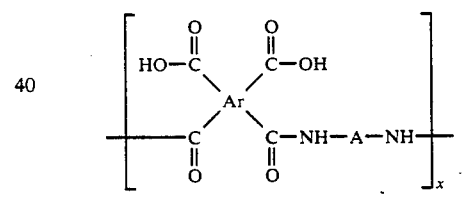

and

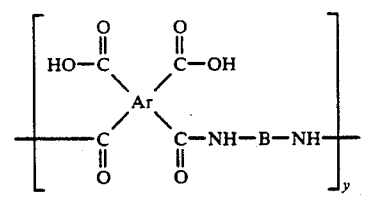

wherein A is Ar' and B is

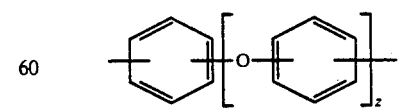

where Ar' is as defined herein, and x and y are integers of from about 100 up to about 1,000, and z is 0-5.

* * * * *